US010457235B2

(12) United States Patent
Koike

(10) Patent No.: US 10,457,235 B2
(45) Date of Patent: Oct. 29, 2019

(54) OCCUPANT DETECTING SYSTEM

(71) Applicant: HONDA MOTOR CO., LTD., Tokyo (JP)

(72) Inventor: Toshihiro Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 15/720,386

(22) Filed: Sep. 29, 2017

(65) Prior Publication Data
US 2018/0093630 A1    Apr. 5, 2018

(30) Foreign Application Priority Data

Oct. 3, 2016 (JP) .................. 2016-195633

(51) Int. Cl.
*B60R 21/015* (2006.01)
*B60N 2/00* (2006.01)
*G06K 9/00* (2006.01)

(52) U.S. Cl.
CPC ........ *B60R 21/01516* (2014.10); *B60N 2/002* (2013.01); *G06K 9/00362* (2013.01)

(58) Field of Classification Search
CPC .................. G01G 9/12; G01G 19/4142; B60R 21/01516; B60N 2/002; G06K 9/00362
See application file for complete search history.

(56) References Cited

U.S. PATENT DOCUMENTS

| 6,138,067 A | 10/2000 | Cobb et al. | |
|---|---|---|---|
| 6,891,111 B1 * | 5/2005 | Morell | B60N 2/002 177/144 |
| 2001/0025730 A1 * | 10/2001 | Cook, Jr. | B60N 2/002 177/25.13 |
| 2003/0220766 A1 * | 11/2003 | Saunders | B60N 2/002 702/173 |
| 2004/0140137 A1 * | 7/2004 | Selig | B60N 2/002 177/144 |
| 2004/0143382 A1 * | 7/2004 | Ishida | B60R 21/01516 701/36 |
| 2004/0249536 A1 | 12/2004 | Hattori et al. | |
| 2005/0109935 A1 | 5/2005 | Manlove et al. | |

(Continued)

FOREIGN PATENT DOCUMENTS

| CN | 1980820 A | 6/2007 |
|---|---|---|
| CN | 102029965 A | 4/2011 |

(Continued)

*Primary Examiner* — Ruth Ilan
(74) *Attorney, Agent, or Firm* — Westerman, Hattori, Daniels & Adrian, LLP

(57) ABSTRACT

A load detector is capable of detecting a load placed on a seat. A temperature detector is capable of detecting a temperature and located adjacent to the load detector. A correction controller corrects the load detected by the load detector in such a way as to deduct a time change amount of the load from the detected load when a time change amount of the temperature detected by the temperature detector is larger than a predetermined threshold value of the time change amount of the temperature and the time change amount of the load detected by the load detector is smaller than a predetermined threshold value of the time change amount of the load. A determination controller determines a sitting condition on the seat based on the corrected load.

6 Claims, 7 Drawing Sheets

(56) References Cited

U.S. PATENT DOCUMENTS

| | | | | |
|---|---|---|---|---|
| 2006/0075834 A1* | 4/2006 | Wanami | ............... | B60N 2/002 73/862.623 |
| 2015/0127224 A1* | 5/2015 | Tabe | ............... | B60R 22/48 701/45 |
| 2016/0033345 A1* | 2/2016 | Koike | ............... | G01L 1/2281 73/862.623 |

FOREIGN PATENT DOCUMENTS

| | | | |
|---|---|---|---|
| CN | 104081172 | A | 10/2014 |
| CN | 104859489 | A | 8/2015 |
| CN | 105539219 | A | 5/2016 |
| JP | 2006-98083 | A | 4/2006 |

\* cited by examiner

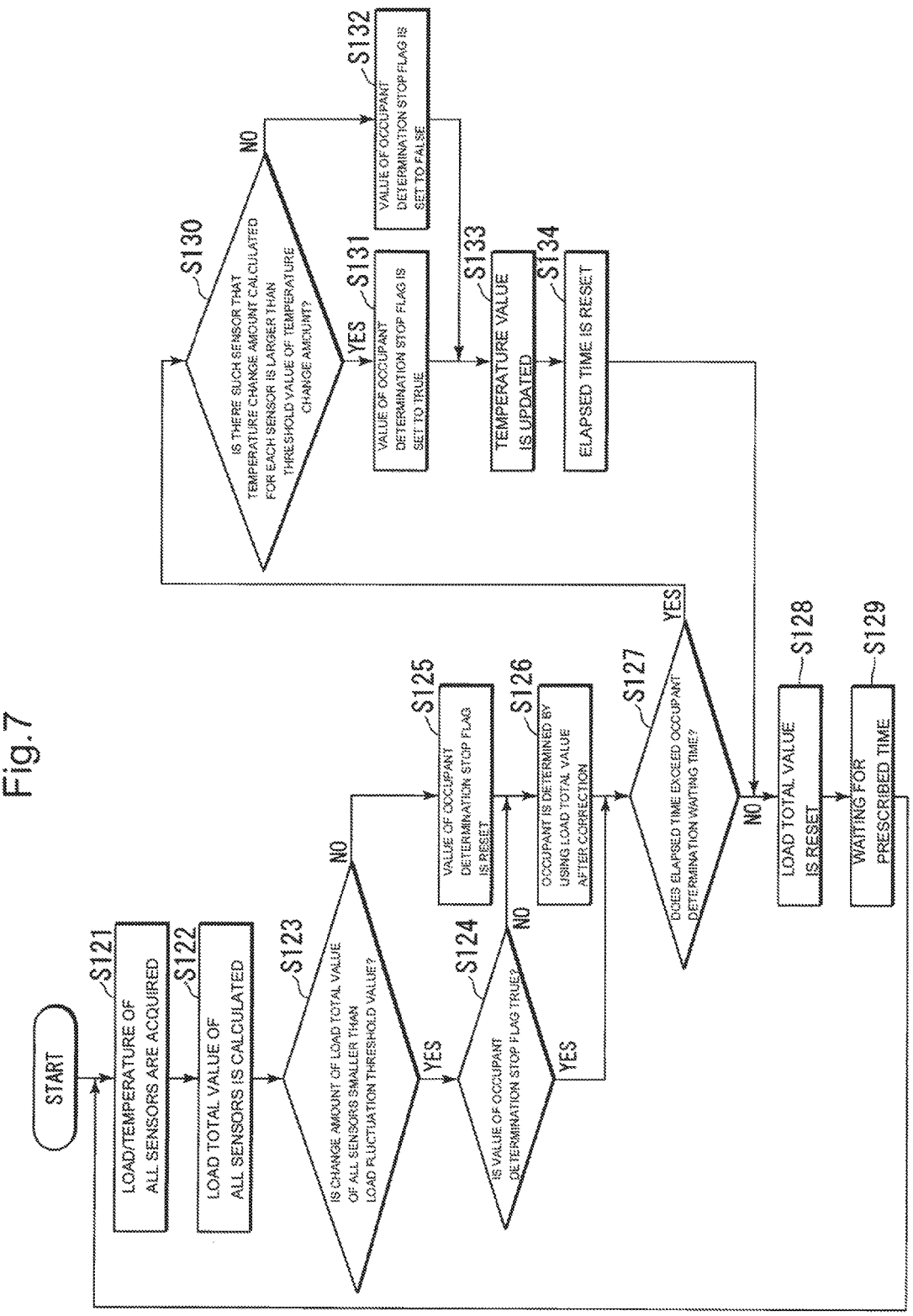

OCCUPANT DETECTING SYSTEM

CROSS REFERENCES TO RELATED APPLICATIONS

The present application claims priority under 35 U.S.C. § 119 to Japanese Patent Application No. 2016-195633, filed Oct. 3, 2016, entitled "Occupant Detection System." The contents of this application are incorporated herein by reference in their entirety.

TECHNICAL FIELD

The present disclosure relates to an occupant detection system.

BACKGROUND

The occupant detection system detects a sitting condition such as existence or nonexistence of an occupant sitting on a seat which is provided in a vehicle, weight or the like. The detected sitting condition is used, for example, for operation control of an air bag device of the vehicle and flashing control of an indicator lamp thereof. The occupant detection system determines the sitting condition of the occupant by a load sensor which measures the weight of the occupant sitting on the seat and by using load data acquired from the load sensor. With respect to a strain gauge used for the load sensor there may be cases where the load outputted fluctuates due to temperature variation. Therefore, a temperature sensor is integrated with the load sensor so as to be located in the vicinity thereof, so that the fluctuation of the load outputted by the load sensor may be corrected based on the temperature detected by the temperature sensor.

SUMMARY

However, when the temperature changes abruptly, the temperature difference is caused between the temperature sensor and the strain gauge or between an upper part and a lower part of the load sensor, or the like. Due to this temperature difference, the load outputted from the load sensor may not be corrected accurately. In other words, since the temperature changes temporarily until the temperature of the load sensor and peripheral components thereof is stabilized, the fluctuation of the outputted load increases. There is a possibility that the sitting condition is not able to be determined accurately since the correct weight of the occupant is not able to be acquired.

Further, in Japanese Patent Application Laid-Open Publication No. 2006-98083, there is disclosed the occupant detection system in which, when it is determined that an amount of the temperature change is large and a velocity of the temperature change is great, the detected load is corrected. In the occupant detection system disclosed in Japanese Patent Application Laid-Open Publication No. 2006-98083, an information table indicating a relationship between a previously stored temperature estimated value and a load correction value is required in the correction of the load. In addition, there may foe cases where the previously stored information is not suitable due to the positional relationship or the like between a sitting position or posture of the occupant and an air conditioner. When the detected load fluctuation is large, the load value may not be corrected accurately since an amount of the load fluctuation attributable to the temperature change is not clear.

Therefore, it is preferable to provide an occupant detection system capable of determining accurately a sitting condition on a seat.

According to one aspect of the embodiments, an occupant detection system comprises a load detection means capable of detecting a load placed on a seat, a temperature detection means capable of detecting a temperature and located adjacent to the load detection means, a correction means for correcting the load detected by the load detection means in such a way as to deduct a time change amount of the load when a time change amount of the temperature detected by the temperature detection means is larger than a predetermined threshold value of the time change amount of the temperature and the time change amount of the load detected by the load detection means is smaller than a predetermined threshold value of the time change amount of the load, and a determination means for determining a sitting condition on the seat based on the load corrected by the correction means.

With this configuration, in the case where the temperature changes abruptly and the time change amount of the detected load is small, the sitting condition is determined based on the load acquired by deducting the time change amount from the detected load. Therefore, when the sitting condition on the seat is stabilized and the temperature changes abruptly, the fluctuation of the load detected due to the abrupt change of the temperature is eliminated. Thus, the sitting condition on the seat is determined accurately.

According to another aspect of the embodiments, an occupant detection system comprises a load detection means capable of detecting a load placed on a seat, a temperature detection means capable of detecting a temperature and located adjacent to the load detection means, a determination means for determining a sitting condition on the seat based on the load detected by the load detection means, and a control means for allowing the determination means to stop the determination of the sitting condition when a time change amount of the temperature detected by the temperature detection means is larger than a predetermined threshold value of the time change amount of the temperature and a time change amount of the load detected by the load detection means is smaller than a predetermined threshold value of the time change amount of the load.

With this configuration, in the case where the temperature changes abruptly and the time change amount of the detected load is small, the determination of the sitting condition based on the detected load is stopped. Therefore, when the sitting condition on the seat is stabilized and the temperature changes abruptly, the unnecessary determination of the sitting condition based on the fluctuation of the load detected due to the abrupt change of the temperature may be prevented. Thus, the sitting condition on the seat is determined accurately.

According to another aspect of the embodiments, in the above referred occupant detection system, the load detection means includes a plurality of load sensors, wherein the load sensors each are arranged at least at both ends of a supporting member of the seat, and the load detected by the load detection means is a total value of the loads which are detected by the load sensors.

With this configuration, since the sitting condition is determined based on the total value of the loads, it is possible to suppress or reduce the fluctuation of the sitting condition due to a variation in time fluctuation of the loads detected by each of the load sensors. Therefore, the sitting condition on the seat is stably determined.

According to another aspect of the embodiments, in the above referred occupant detection system, the temperature detection means includes the same number of temperature sensors as the load sensors, wherein the time change amount of the temperature detected by the temperature detection means is the time change amount of the temperature detected by at least one of the temperature sensors.

With this configuration, the abrupt change of the temperature serving as an error factor of detected loads is determined based on the temperature detected by at least one of the plurality of temperature sensors. Therefore, the generation of the load fluctuation which can be a cause of determination error of the sitting condition due to the temperature change may be detected more as compared with the case where the abrupt change of the temperature is determined by synthesizing the temperatures detected by the plurality of temperature sensors. The determination of the sitting condition based on the unnecessary load fluctuation is avoided, so that the reliability of the sitting condition to be determined is improved.

According to another aspect of the embodiments, in the above referred occupant detection system, a determination cycle of the time change amount of the temperature is longer than a determination cycle of the sitting condition. Generally, the detection of the significant time change of the temperature requires a longer time than the change of the sitting condition. Since the determination of the time change amount of the load is prevented from being performed more than necessary, a processing amount does not become excessive.

According to the embodiments, for example, the sitting condition on the seat can be determined accurately.

BRIEF DESCRIPTION OF THE DRAWINGS

FIG. 7 is a flow chart showing the occupant determination processing in accordance with the second embodiment.

DETAILED DESCRIPTION

First Embodiment

Hereinafter, a first embodiment of the present disclosure will be described with reference to accompanying drawings. In the following description, front and rear designate each direction of forward traveling and reverse traveling of a vehicle unless otherwise specified. Left and right designate left and right relative to the front and rear, respectively. Top and bottom designate directions of a top plate and a floor with reference to a driver's seat of the vehicle.

Figure 1:
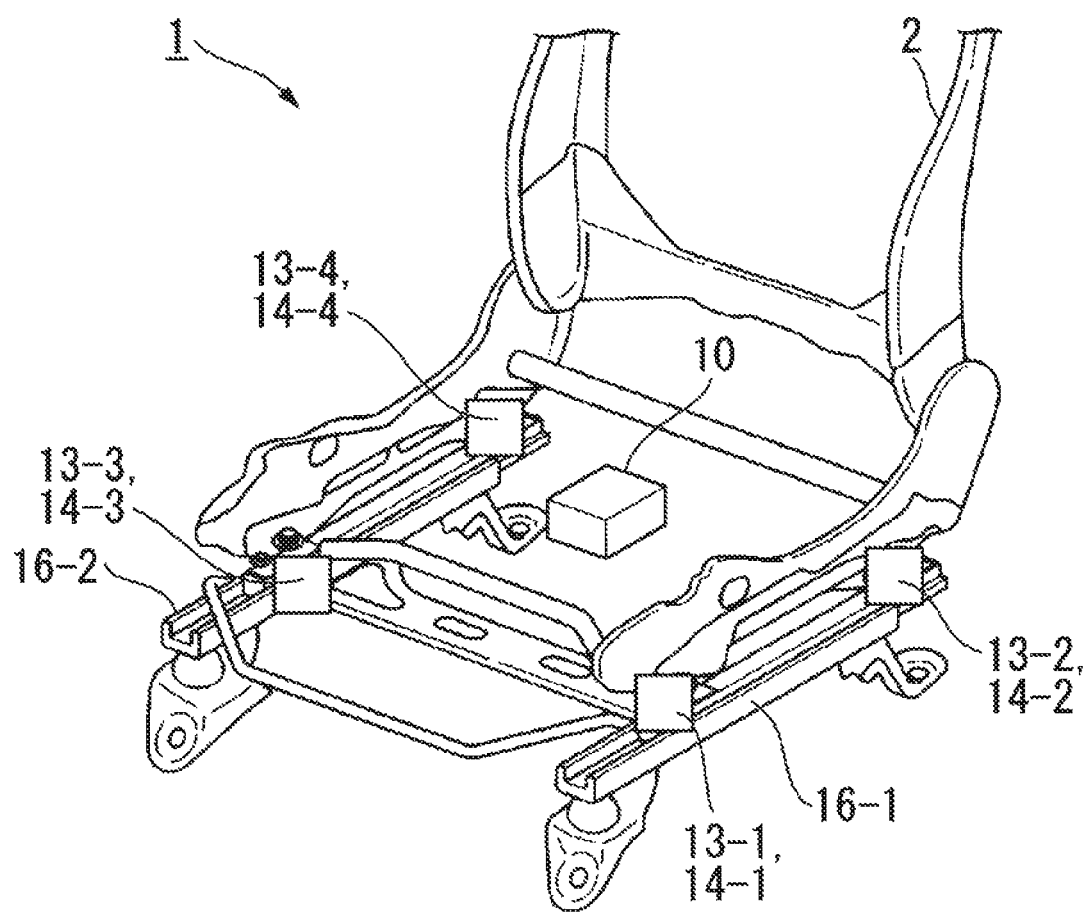
FIG. 1 is a perspective view showing a configuration of an occupant detection system in accordance with a first embodiment.

FIG. 1 is a perspective view showing a configuration of an occupant detection system 1 in accordance with this embodiment. In an example shown in FIG. 1, the occupant detection system 1 includes an electronic control unit (ECU: Electronic Control Unit) 10, four load sensors 13-1~13-4, and four temperature sensors 14-1~14-4. The occupant detection system 1 is mounted on a frame of a seat 2 so as to determine a sitting condition of an occupant on the seat 2. One load sensor 13 and one temperature sensor 14 each are located adjacent to each other and integrally configured as a sensor unit. The seat 2 is fixed on a floor of the vehicle in a forwardly and rearwardly movable manner through a pair of left and right seat rails 16-1, 16-2 and each of base members (not shown) thereof. The load sensor 13-1 and the temperature sensor 14-1 are located on a front side of both end portions of the base member fixed on the seat rail 16-1, and the load sensor 13-2 and the temperature sensor 14-2 are located on a rear side thereof. The load sensor 13-3 and the temperature sensor 14-3 are located on a front side of both end portions of the base member fixed on the seat rail 16-2, and the load sensor 13-4 and the temperature sensor 14-4 are located on a rear side thereof.

Figure 2:
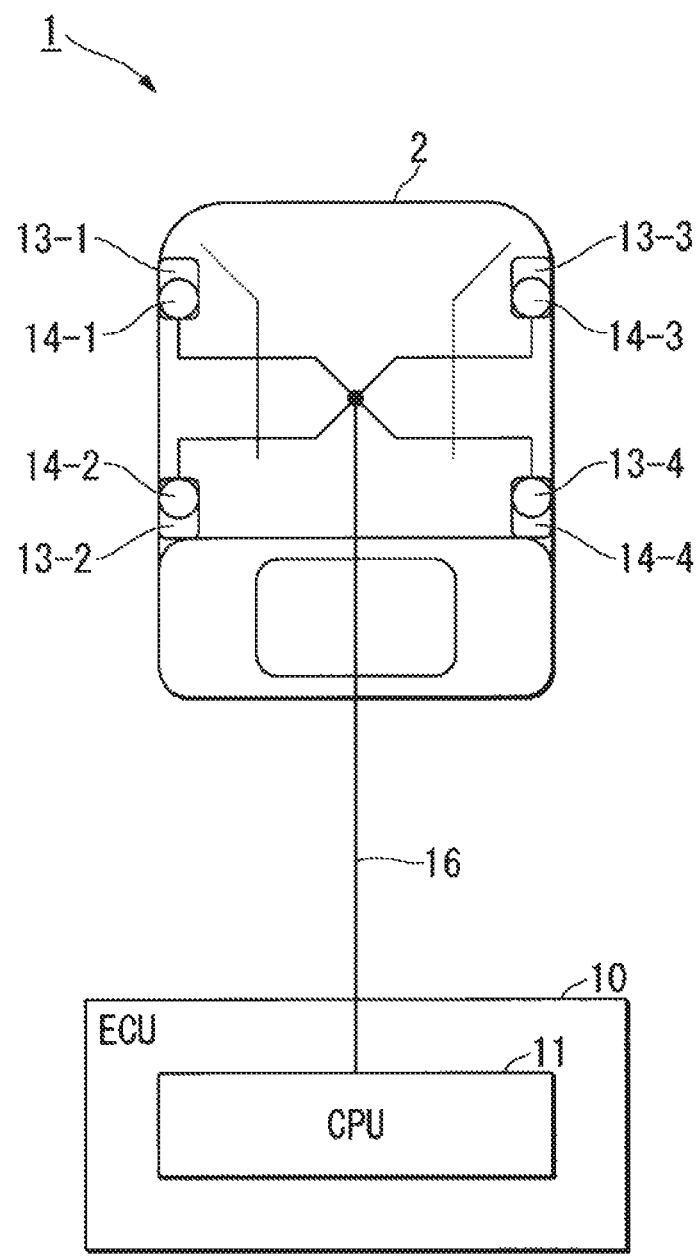
FIG. 2 is a plan view showing the configuration of the occupant detection system in accordance with the first embodiment.

FIG. 2 is a plan view showing the configuration of the occupant detection system 1 in accordance with this embodiment. Each of the four load, sensors 13-1~13-4 detects a load caused in its own part. The load sensors 13-1~13-4 are strain gauge sensors, for example. The strain gauge sensor is configured to reduce its resistance value when shrunk by the load applied from the outside. Accordingly, the strain gauge sensor outputs, as a load signal, an electric signal which has a voltage proportionate to a load value when a predetermined application voltage is applied. The load sensors 13-1~13-4 are electrically connected to the ECU 10 through a wire harness 16 and output the load signals indicating the detected load values to the ECU 10, respectively.

Each of the four temperature sensors 14-1~14-4 detects the temperature of its own part. The temperature sensors 14-1~14-4 are thermistors, for example. The thermistor is an NTC (Negative Temperature Coefficient) thermistor in which an electric resistance value is reduced in relation to ruse in temperature. Therefore, the NTC thermistor outputs, as a temperature signal, an electric signal which has a voltage correlated with the temperature when a predetermined application voltage is applied. The temperature sensors 14-1~14-4 are electrically connected to the ECU 10 through the wire harness 16. The temperature sensors 14-1~14-4 output the temperature signals indicating the detected temperature to the ECU 10, respectively.

The ECU 10 is composed of a CPU (Central Processing Unit). The CPU reads a predetermined control program which is previously stored in an ROM (Read Only Memory; not shown) and performs processing indicated by a command described in the read control program, so that a function of the occupant detection device is realized. The sitting condition of the occupant on the seat 2 is determined as the function of the occupant detection device.

The ECU 10 outputs a sitting signal indicating the determined sitting condition to an air bag system (not shown). The air bag system prohibits deployment of an air bag provided in the air bag system when the sitting signal inputted from the ECU 10 indicates an unoccupied state and permits the deployment of the air bag when the sitting signal indicates an occupied state. The air bag system may be configured such that a deployment amount of the air bag increases as the load of the occupant indicated by the sitting signal increases.

Further, the ECU 10 may perform flashing control of a predetermined light-emitting part based on the sitting signal, instead of the control with respect to the air bag system or in addition to such control. The ECU 10 is configured to turn on the light-emitting part when the sitting signal indicates the occupied state and turn off the light-emitting part when the sitting signal indicates the unoccupied state. The light-emitting part is a tail lamp arranged in a rear part of the vehicle, an indicator lamp arranged in a front part of a driver's seat, or the like, for example.

Figure 3:
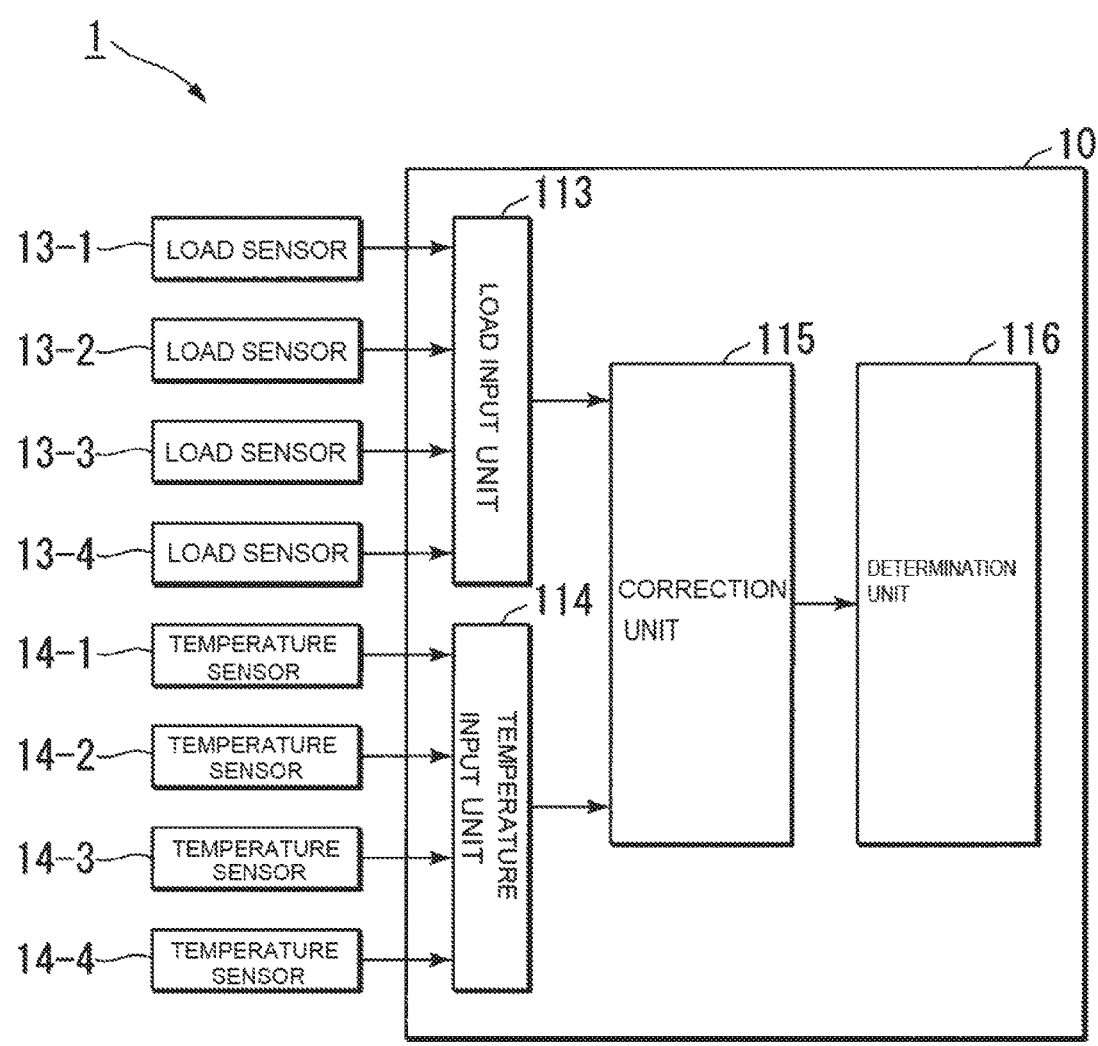
FIG. 3 is a block diagram showing a function of the occupant detection system in accordance with the first embodiment.

FIG. 3 is a block diagram showing a function of the occupant detection system 1 in accordance with this embodiment. The ECU 10 is composed of a load input unit 113, a temperature input unit 114, a correction unit 115 and a determination unit 116 as the function of the occupant detection device.

The load signals from each of the load sensors 13-1~13-4 are inputted to the load input unit 113. The load input unit 113 is provided with an A/D (Analog-to-Digital) converter, for example, thereby to convert inputted analog load signals to digital load data each indicating the load values. The load input unit 113 is provided with a RAM (Random Access Memory), for example, thereby to temporarily store each of the load data converted into the RAM.

The temperature signals from each of the temperature sensors 14-1~14-4 are inputted to the temperature input unit 114. The temperature input unit 114 is provided with an A/D converter, for example, thereby to convert inputted analog temperature signals to digital temperature data each indicating the temperature values. The temperature input unit 114 is provided with a RAM, for example, thereby to temporarily store each of the temperature data converted into the RAM.

The correction unit 115 acquires the load data indicating the load values which are detected by the load sensors 13-1~13-4 from the load input unit 113 and the temperature data indicating the temperature values which are detected by the temperature sensors 14-1~14-4, at every predetermined first cycle. The first cycle corresponds to an occupant determination waiting time to be referred to later. The first cycle is, for example, 0.3 to 1 sec. The correction unit 115 calculates, as a load total value, a total value among the load sensors of the latest load values which are acquired by each of the load sensors at that point of time. The correction unit 115 corrects the calculated load total value by adding a load correction value to be referred to later. The correction unit 115 outputs a corrected load total value to the determination unit 116.

The correction unit 115 calculates, as a temperature change amount, a difference between the latest temperature values and the temperature values acquired last time with respect to each of the temperature sensors at every predetermined second cycle. The second cycle corresponds to a load correction waiting time to be referred to later. The second cycle is, for example, 10 to 60 sec. The correction unit 115 determines whether the temperature sensor of which a magnitude of the calculated temperature change amount is larger than a temperature change threshold value which is a predetermined threshold value of the temperature change amount exists or not. The correction unit 115 resets the load correction value to zero, when it determines that it does not exist. The correction unit 115 calculates a difference between the latest load total value and the load total value acquired last time, as a change amount of the load total value, when it determines that it exists. The correction unit 115 determines whether or not a magnitude of the calculated change amount of the load total value is smaller than a load fluctuation threshold value which is a predetermined threshold value of the load total value. When determining that the magnitude of the change amount of the load total value is smaller than the predetermined threshold value of the load total value, the correction unit 115 updates the load correction value by adding the calculated change amount of the load total value to the load correction value. When determining that the magnitude of the change amount of the load total value is not smaller than the predetermined threshold value of the load total value, the correction unit 115 does not update the load correction value. Thereafter, the correction unit 115 updates the previous load total value and the previous temperature values of each of the temperature sensors into the latest load total value and the latest temperature values of each of the temperature sensors.

The determination unit 116 performs occupant determination at every second cycle by using the load total value inputted from the correction unit 115. The determination unit 116 is provided with an RAM in which a sitting condition determination table indicating the sitting condition corresponding to each of a plurality of set load ranges is stored in advance. There are five load ranges, namely, five sitting conditions to be determined, for example. The five sitting conditions are, for example, an unoccupied state, a child 1, a child 2, an adult 1 and an adult 2. The unoccupied state, the child 1, the child 2, the adult 1 and the adult 2 each of which indicates the sitting condition corresponding to the load ranges which become larger in the order named. For example, the lower limit of the load range of the unoccupied state is zero. The upper limit of the load range of the unoccupied state is the load value which is a threshold value for determining whether or not the load value is significantly larger than zero. The load ranges of the child 1, the child 2, the adult 1 and the adult 2 may be decided based on average weight of each of children of six years old and under, children between seven years old and twelve years old, adult women and adult men. Some applications may treat each of the four sitting conditions, namely, the child 1, the child 2, the adult 1 and the adult 2 except the unoccupied state of the five sitting conditions as the occupied state. The determination unit 116 identifies the load range within which the load total value after correction falls and determines the sitting condition corresponding to the identified load range.

(Decision Processing of Load Correction Value)

Figure 4:
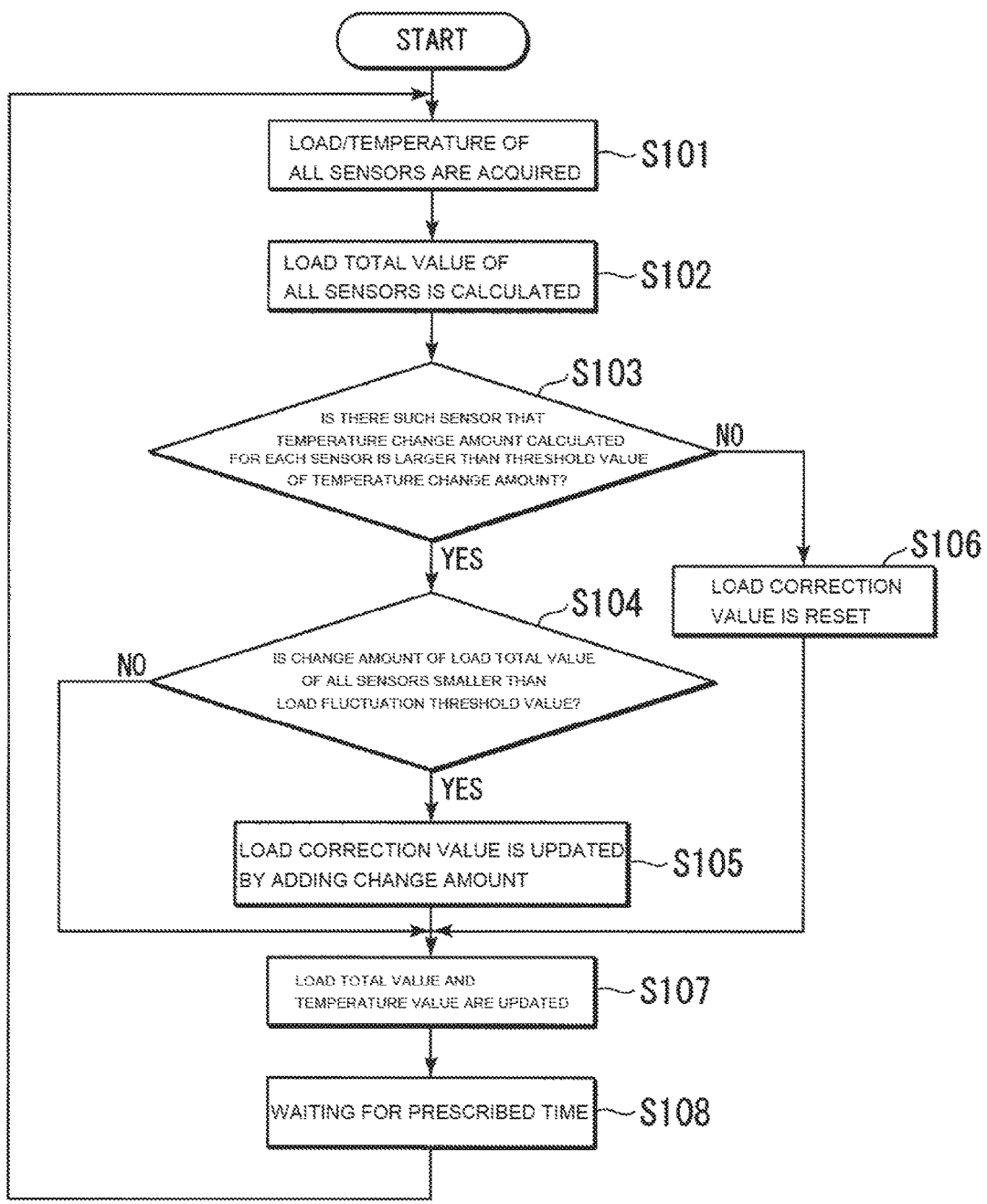
FIG. 4 is a flow chart showing a decision processing of a load correction value in accordance with the first embodiment.

Next, the decision processing of the load correction value in accordance with this embodiment will be described. FIG. 4 is a flow chart showing the decision processing of the load correction value in accordance with this embodiment.

(Step S101) The correction unit 115 acquires the load data indicating the latest load values WTa_x which are detected by all of the load sensors 13-x (x is an integer from 1 through 4) from the load input unit 113 and the temperature data indicating the latest temperature values TMa_x which are detected by all of the temperature sensors 14-x. Thereafter, processing proceeds to Step S102.

(Step S102) The correction unit 115 calculates, as the load total value SfTa_sum, the total value among the load sensors 13-1~13-4 of the latest load values which are acquired by each of the load sensors at that point of time. Thereafter, processing proceeds to Step S103.

(Step S103) The correction unit 115 calculates, as the temperature change amount TMa_x−TMb_x, a difference between the latest temperature value TMa_x and the temperature value acquired last time, namely, the second cycle before with respect to each of the temperature sensors. The correction unit 115 compares an absolute value |TMa_x−TMb_x| of the temperature change amount and a temperature change threshold value TMth as the threshold value of the temperature change amount with respect to each of the temperature sensors and determines whether the temperature sensor of which the absolute value |TMa_x−TMb_x| of the temperature change amount is larger than the temperature change threshold value TMth exists or not. When it is determined that it exists (Step S103: YES), processing proceeds to Step S104. When it is determined that it does not exist (Step S103: NO), processing proceeds to Step S106.

(Step S104) The correction unit 115 calculates a difference between the latest load total value WTa_sum and the previous load total value WTb_sum, as a change amount WTa_sum−WTb_sum of the load total value. The correction unit 115 determines whether or not an absolute value |WTa_sum−WTb_sum| of the calculated change amount of the load total value is smaller than a load fluctuation threshold value WTth. When it is determined that the absolute value is smaller than the load fluctuation threshold value WTth (Step S104: YES), processing proceeds to S105. When it is determined that the absolute value is not smaller than the load fluctuation threshold value WTth (Step S104: NO), processing proceeds to Step S107.

(Step S105) The correction unit 115 updates the load correction value WTo by adding the change amount WTa_sum−WTb_sum of the load total value to the load correction value WTo. Thereafter, processing proceeds to Step S107.

(Step S106) The correction unit 115 resets the load correction value WTo to zero. Thereafter, processing proceeds to Step S107.

(Step S107) The correction unit 115 updates the previous load total value WTb_sum and the previous temperature; values TMb_x of each of the temperature; sensors 14-x into the latest load total value WTa_sum and the latest temperature values TMa_x of each of the temperature sensors 14-x, respectively. Thereafter, processing proceeds to Step S108.

(Step S108) The correction unit 115 waits for the load correction waiting time INT as the prescribed time. Thereafter, processing proceeds to Step S101.

(Occupant Determination Processing)

Figure 5:
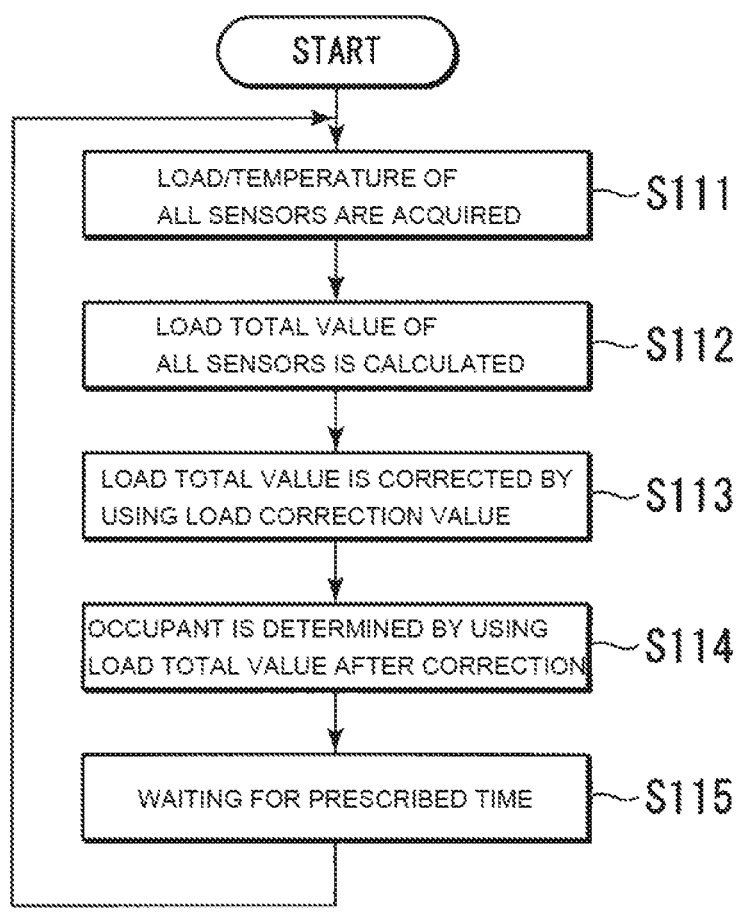
FIG. 5 is a flow chart showing an occupant determination processing in accordance with the first embodiment.

Next, the occupant determination processing in accordance with this embodiment will be described. FIG. 5 is a flow chart showing the occupant determination processing in accordance with this embodiment.

(Step S111) The correction unit 115 acquires the load data indicating the latest load values WT_x detected by each of the load sensors 13-x, from the load input unit 113. Thereafter, processing proceeds to Step S112.

(Step S112) The correction unit 115 calculates, as the load total value WTa_sum, the total value among the load sensors 13-1~13-4 of the latest load values WT_x which are acquired by each of the load sensors at that point of time. Thereafter, processing proceeds to Step S113.

(Step S113) The correction unit 115 calculates the load total value OWT_sum after correction by deducting the load correction value WTo from the load total value WTa_sum. The load correction value WTo used for the calculation of the load total value OWT_sum is the latest load correction value WTo which is acquired at that point of time by the processing as shown in FIG. 4. Thereafter, processing proceeds to Step S114.

(Step S114) The determination unit 116 refers to the sitting condition determination table thereby to identify the load range within which the load total value OWT_sum after correction falls, and determines the sitting condition corresponding to the identified load range (occupant determination). Thereafter, processing proceeds to Step S115.

(Step S115) The correction unit 115 waits for an occupant determination waiting time OINT as a prescribed time. Thereafter, processing proceeds to Step S111.

As described above, the occupant detection system 1 according to this embodiment comprises the load sensors 13-1~13-4, the temperature sensors 14-1~14-4, the correction unit 115 and the determination unit 116 each as the load detection means, the temperature detection means, the correction means and the determination means. The load detection unit is capable of detecting the load placed on the seat. The temperature detection unit is located adjacent to the load detection unit so as to be able to detect the temperature. The correction unit performs corrections by deducting the time change amount of the load from the load detected by the load detection unit when the time change amount per predetermined unit time of the temperature detected by the temperature detect ion unit is larger than the predetermined threshold value of the time change amount of the temperature and the time change amount per the unit time of the load detected by the load detection unit is smaller than the predetermined time change amount of the load. When the time change amount of the temperature detected by the temperature detection unit is not larger than the predetermined threshold value of the time change amount of the temperature, or when the time change amount of the load detected by the load detection unit is not smaller than the predetermined time change amount of the load, the correction unit does not perform such corrections as to deduct the time change amount of the load from the load detected by the load detection unit. The determination unit determines the sitting condition on the seat based on the load acquired from the correction unit.

According to this configuration, in the case where the temperature changes abruptly and the time change amount of the detected load is large, the sitting condition is determined based on the detected load without being corrected. In the case where the time change amount of the detected load is small, the sitting condition is determined based on the load acquired by deducting the time change amount from the detected load. Therefore, when the sitting condition on the seat is stabilized and the temperature changes abruptly, the fluctuation of the load detected due to the abrupt change of the temperature is eliminated. On the other hand, since the sitting condition is determined based on the detected load irrespective of the temperature change in the case where the sitting condition on the seat fluctuates significantly, the fluctuation of such sitting condition is detected. Thus, the sitting condition on the seat can be determined more accurately.

Second Embodiment

Next, a second embodiment of the present disclosure will be described. In the following description, differences from the first embodiment are mainly described. Component elements identical to those of the first embodiment are given like reference characters, and the description of the first embodiment will be invoked.

Figure 6:
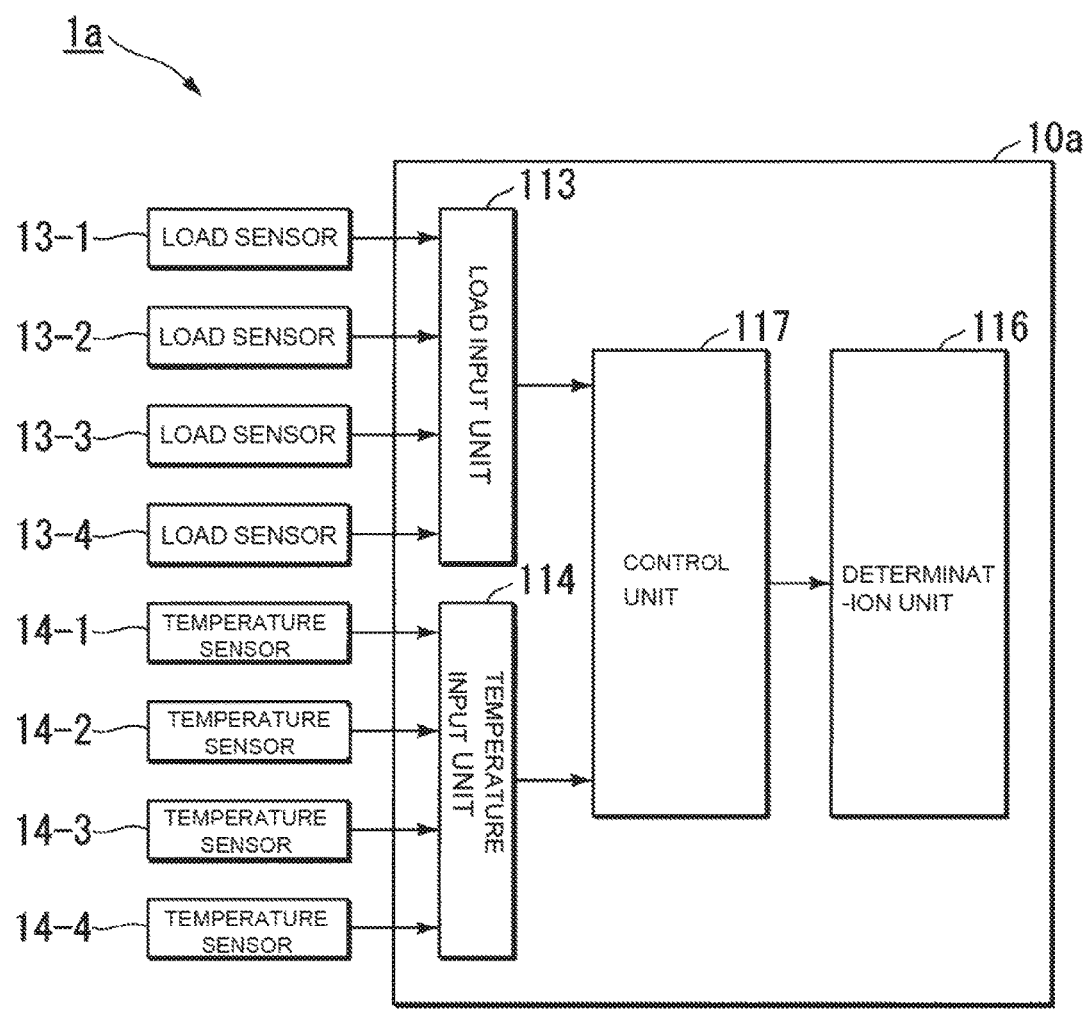
FIG. 6 is a block diagram showing the function of the occupant detection system in accordance with a second embodiment.

FIG. 6 is a block diagram showing the function of the occupant detection system 1a in accordance with this embodiment. The occupant detection system 1a includes four load sensors 13-1~13-4, four temperature sensors 14-1~14-4 and an ECU 10a. The ECU 10a is composed of a load input unit 113, a temperature input unit 114, a control unit 117 and a determination unit 116 as the function of the occupant detection device. In other words, the ECU 10a is provided with the control unit 117 instead of the correction unit 115 of the ECU 10.

The control unit 117 acquires the load data indicating the load values detected by the load sensors 13-1~13-4, from the load input unit 113 at every occupant determination waiting time. The control unit 117 calculates the load total value among the load sensors of the latest load values acquired at that point of time by each of the load sensors.

The control unit 117 calculates, as the change amount of the load total value, the difference between the latest load total value and the load total value of the load values acquired last time. The control unit 117 determines whether or not the magnitude of the calculated change amount of the load total value is smaller than the load fluctuation threshold value which is the predetermined threshold value of the load total value. When it is determined that the change amount of the load total value is smaller than the predetermined threshold value of the load total value, the control unit 117 determines whether or not a value of an occupant determination stop flag is a true value (true). The occupant determination stop flag is 1 bit data indicating whether or not the occupant-determination, namely, the determination of the sitting condition is stopped. The true value (true) indicates that the occupant determination is stopped, while a false value (false) indicates that the occupant determination is not stopped. When it is determined that the magnitude of the change amount of the load total value is not smaller than the predetermined threshold value of the load total value, the control unit 117 resets the value of the occupant, determination stop flag to the false value (false).

In the case where the value of the occupant determination stop flag is the false value (false), the control unit 117 outputs the calculated load total value to the determination unit 116. The determination unit 116 determines the sitting condition based on the load total value inputted from the control unit 117 by using the same method as the determination unit 116 of the first embodiment. However, in this embodiment, the load total value inputted into the determination unit 116 is not corrected based on the load correction value.

On the other hand, the control unit 117 acquires the temperature data indicating the temperature values detected by the temperature sensors 14-1~14-4 at every occupant correction waiting time. The control unit 117 calculates, as a temperature change amount, a difference between the latest temperature values obtained from each of the temperature sensors and the temperature value acquired last time. The control unit 117 determines whether the temperature sensor of which the magnitude of the calculated temperature change amount is larger than the temperature change threshold value which is the predetermined threshold value of the temperature change amount exists or not. When it is determined that it does not exist, the control member 117 sets the value of the occupant determination stop flag to the true value (true). When it is determined that it exists, the control unit 117 resets the value of the occupant determination stop flag to the false value (false). Then, the control unit 117 updates the previous temperature values of each of the temperature sensors to the latest temperature values of each of the temperature sensors and resets the time elapsed to zero.

(Occupant Determination Processing)

Next, the occupant determination processing according to this embodiment will be described. FIG. 7 is a flow chart showing the occupant determination processing in accordance with this embodiment.

(Step S121) The control unit 117 acquires the load data indicating the latest load values WTa_x which are detected by all of the load sensors 13-x from the load input unit 113 and the temperature data indicating the latest temperature values TMa_x which are detected by all of the temperature sensors 14-x. Thereafter, processing proceeds to Step S122.

(Step S122) The control unit 117 calculates, as the load total value WTa_sum, the total value among the load sensors 13-1~13-4 of the latest load values which are acquired by each of the load sensors at that point of time. Thereafter, processing proceeds to Step S123.

(Step S123) The control unit 117 calculates the difference between the latest load total value WTa_sum and the previous load total value WTb_sum, as the change amount WTa_sum−WTb_sum of the load total value. The control unit 117 determines whether or not the absolute value |WTa_sum−WTb_sum| of the calculated change amount of the load total value is smaller than the load fluctuation threshold value WTth. When it is determined that the absolute value is smaller than the load fluctuation threshold value WTth (Step S123: YES), processing proceeds to S124. When it is determined that the absolute value is not smaller than the load fluctuation threshold value WTth (Step S123: NO), processing proceeds to Step S125.

(Step S124) The control unit 117 determines whether or not the value OD_stop of the occupant determination stop flag is the true value (true). When it is determined that it is the true value (true) (Step S124: YES), processing proceed to Step 127. When it is determined that it is the false value (false) (Step 124: NO), processing proceeds to Step S126.

(Step S125) The control unit 117 resets the value OD_stop of the occupant determination stop flag to the false value (false). Thereafter, processing proceeds to Step S126.

(Step S126) The determination unit 116 refers to the sitting condition determination table thereby to identify the load range within which the load total value WTa_sum falls, and determines the sitting condition corresponding to the identified load range (occupant determination). Thereafter, processing proceeds to Step S127.

(Step S127) The control unit determines whether or not the time elapsed INT_elap exceeds a load correction waiting time INT. When it is determined that it exceeds the load correction waiting time (Step S127: YES), processing proceeds to Step S130. When it is determined that it does not exceed the load correction waiting time (Step S127: NO), processing proceeds to Step S128.

(Step S128) The control unit 117 updates the previous load total value WTb_sum to the latest load total value WTa_sum. Thereafter, processing proceeds to Step S129.

(Step S129) The control unit 117 waits for the occupant determination waiting time OINT as the prescribed time. Thereafter, processing proceeds to Step S121.

(Step S130) The control unit 117 calculates, as the temperature change amount TMa_x−TMb_x, the difference between the latest temperature value TMa_x and the temperature value acquired last time with respect to each of the temperature sensors. The control unit 117 compares the absolute value |TMa_x−TMb_x| of the temperature change amount and the temperature change threshold value TMth with respect to each of the temperature sensors and determines whether the temperature sensor of which the absolute value |TMa_x−TMb_x| of the temperature change amount is larger than the temperature change threshold value TMth exists or not. When it is determined that it exists (Step S130: YES), processing proceeds to Step S131. When it is determined that it does not exist (Step S130: NO), processing proceeds to Step S132.

(Step S131) The control unit 117 resets the value OD_stop of the occupant determination stop flag to the true value (true). Thereafter, processing proceeds to Step S133.

(Step S132) The control unit 117 resets the value OD_stop of the occupant determination stop flag to the false value (false). Thereafter, processing proceeds to Step S133.

(Step S133) The control unit 117 updates the previous temperature values TMb_x of each of the temperature sensors 14-x to the latest temperature values TMa_x of each of the temperature sensor 14-x. Thereafter, processing proceeds to Step 134.

(Step S134) The control unit 117 resets the time elapsed INT_elap to zero. Thereafter, processing proceeds to Step S128.

As described above, the occupant detection system 1a according to this embodiment comprises the load sensors 13-1~13-4, the temperature sensors 14-1~14-4, the control unit 117 and the determination unit 116 each as the load detection means, the temperature detection means, the control means and the determination means. The determination unit determines the sitting condition on the seat based on the load acquired from the control unit. The control unit allows the determination unit to stop the determination of the sitting condition when the time change amount per predetermined unit time of the temperature detected by the temperature detection unit is larger than the predetermined threshold value of the time change amount of the temperature and the time change amount per the unit time of the load detected by the load detection unit is smaller than the predetermined time change amount of the load. When the time change amount per the unit time of the temperature detected by the temperature detection unit is not larger than the predetermined threshold value of the time change amount of the temperature, or when the time change amount for the unit time of the load detected by the load detection unit is not smaller than the predetermined time change amount of the load, the control unit cancels the stop of the determination of the sitting condition with respect to the determination unit.

With this configuration, in the case where the temperature changes abruptly, the sitting condition is determined based on the detected load when the time change amount of the detected load is large, while the determination of the sitting condition is stopped when the time change amount of the detected load is small. Therefore, when the sitting condition on the seat is stabilized and the temperature changes abruptly, the unnecessary determination of the sitting condition based on the fluctuation of the load detected due to the abrupt change of the temperature may be prevented. On the other hand, when the sitting condition on the seat fluctuates, the sitting condition changed based on the detected load is detected irrespective of the temperature change, Thus, the sitting condition on the seat can be determined more accurately.

Although in the above referred embodiments there are shown examples in which the number of the load sensor and the temperature sensor is four each, the number thereof is not so limited. The number of the load sensor and the temperature sensor may be not more than three or not less than five. It is preferable to arrange the plurality of load sensors in the region to which the load from the seat 2 is applied, so as to be dispersed as far as possible. Since the load total value which is the total of the load values from the plurality of load sensors is used for determination of the sitting condition, the influence due to the variations of the fluctuation of the load values from each of the load sensors based on the movement of the vehicle or the movement of the occupant or other obstacle is mitigated. In the case where two load sensors are provided, the load sensors each may be arranged on the front side and on the rear side of both end portions of the base member provided for any one of the seat rails 16-1, 16-2.

Further, although in the above referred embodiments there are shown examples in which the temperature change amount employed in the correction unit 115 and the control unit 117 is the difference between the latest temperature at that point of time and the previous temperature, the temperature change amount is not so limited. The temperature change amount may be a difference between an actually measured temperature at that point of time and a moving average temperature. The moving average temperature is calculated by performing moving average processing with respect to the temperature of more than two cycles acquired within a predetermined period up to that point of time. Further, the temperature change threshold value TMth may be a larger value than a deviation of the difference between the actually measured temperature and the moving average temperature. Consequently, the significant change of the temperature is detected accurately.

Further, although in the above referred embodiments there are shown examples in which the change amount of the load total value employed in the correction unit 115 and the control unit 117 is the difference between the latest load total value at that point of time and the previous load total value, the load total value change amount is not so limited. The load total value change amount may be a difference between an actually measured load total value at that point of time and a moving average load total value. The moving average load total value is calculated by performing moving average processing with respect to the load total value of more than two cycles acquired within a predetermined period up to that point of time. Further, the load fluctuation threshold value WTth may be a larger value than a deviation of the difference between the actually measured load total value and the moving average load total value. Consequently, the significant change of the load total value is detected accurately.

Furthermore, a part of the ECU 10, 10a in the above referred embodiments such as the load input unit 113, temperature input unit 114, the correction unit 115, the determination unit 116 and the control unit 117 may be configured so as to be realized by a computer. In this case, a program for realizing this control function may be recorded on a computer readable recording medium, and the program recorded on the recording medium may be realized by being read and executed by a computer system. Herein, such "computer system" is the computer system built in the ECU 10, 10a and includes an OS (Operating System) and hardware for peripheral equipment or the like. Moreover, such "computer readable recording medium" means a portable medium, such as a flexible disk, a magneto-optic disk, an ROM, a CD (Compact Disk)-ROM or the like and a recording device such as a hard disk or the like built in the computer system. Further, the "computer readable recording medium" may include a device which retains the program in a short, time and dynamically, like a communication line when transmitting the program through a network such as internet, etc. or a communication channel such as telephone line, etc. and a device which retains the program for a certain period of time, like volatile memory inside the computer system serving as a server or a client in that case. In addition, the above referred program may be used for realizing a part of the above referred function and also may be used for realizing the above referred function in combination with a program which is already recorded in the computer system.

Further, a part or all of the ECU 10, 10a in the above referred embodiments may be realized as an integrated circuit such as LSI (Large Scale Integration), etc. Each of function blocks of the ECU 10, 10*a* may be configured as a processor separately, and a part or all of the function blocks may be integrated so as to be configured as a processor. Further, a technique of the integrated circuit is not limited to LSI but may be realized by a dedicated circuit or general purpose processor. Further, in the case where the technique of the integrated circuit taking the place of LSI has appeared with progress in semiconductor technique, the integrated circuit, based on such technique may be employed.

While the embodiment of the present disclosure has been described in detail with reference to the drawings, specific configuration is not limited to the above referred embodiment and it is understood that various design changes and the like may be made in the disclosure without departing from the spirit thereof. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. An occupant detection system comprising:
   a load detector detecting a load of an object placed on a seat;
   a temperature detector disposed adjacent to the load detector and detecting a temperature;
   a correction controller configured to correct the load detected by the load detector when (i) and (ii) are met:
   (i) a time change amount of the temperature detected by the temperature detector is larger than a predetermined threshold value of the time change amount of the temperature, and
   (ii) the time change amount of the load detected by the load detector is smaller than a predetermined threshold value of the time change amount of the load, wherein the correction controller corrects the load detected by the load detector by subtracting the time change amount of the load from the load detected by the load detector; and
   a determination controller configured to determine a sitting condition of the object on the seat by using the load corrected by the correction controller.

2. The occupant detection system according to claim 1, wherein the load detector includes a plurality of load sensors, the load sensors being disposed at least at both ends of a supporting member of the seat, and
   wherein the load detected by the load detector is a total value of the loads which are detected by the respective load sensors.

3. The occupant detection system according to claim 2, wherein the temperature detector includes the same number of temperature sensors as the number of the load sensors, and the time change amount of the temperature detected by the temperature detector is the time change amount of the temperature detected by at least one of the temperature sensors.

4. The occupant detection system according to claim 1, wherein a determination cycle of the time change amount of the temperature is longer than a determination cycle of the sitting condition.

5. The occupant detection system according to claim 1, wherein the correction controller does not correct the load detected by the load detector when the time change amount of the load detected by the load detector is not smaller than the predetermined threshold value of the time change amount of the load, and the determination controller determines the sitting condition of the object on the seat by using the load detected by the load detector.

6. An occupant detection method comprising:
   (a) detecting, by using a load detector, a load of an object placed on a seat;
   (b) detecting a temperature by using a temperature detector disposed adjacent to the load detector;
   (c) correcting, by using a computer, the load detected by the load detector when (i) and (ii) are met:
   (i) a time change amount of the temperature detected by the temperature detector is larger than a predetermined threshold value of the time change amount of the temperature and
   (ii) the time change amount of the load detected by the load detector is smaller than a predetermined threshold value of the time change amount of the load, wherein the step (c) corrects the load detected by the load detector by subtracting the time change amount of the load from the load detected by the load detector; and
   (d) determining, by using the computer, a sitting condition of the object on the seat based on the corrected load.

* * * * *